(12) United States Patent  
Watkins et al.

(10) Patent No.: US 7,610,671 B2
(45) Date of Patent: Nov. 3, 2009

(54) METHOD FOR ASSEMBLING AN ELECTRIC MOTOR USING A SLIP FIT TOLERANCE RING

(75) Inventors: William J. Watkins, Tipp City, OH (US); Chih M. Lin, Tipp City, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 283 days.

(21) Appl. No.: 11/262,635

(22) Filed: Oct. 31, 2005

(65) Prior Publication Data

US 2007/0096572 A1    May 3, 2007

(51) Int. Cl.
*F16C 35/077* (2006.01)
*F16D 1/08* (2006.01)
*H02K 5/16* (2006.01)
*H02K 15/00* (2006.01)
*H02K 15/14* (2006.01)

(52) U.S. Cl. .................. 29/596; 29/598; 29/898.07; 29/525.01; 403/203; 403/223; 403/282; 403/366; 403/369

(58) Field of Classification Search .................. 29/596, 29/598, 436, 437, 506, 525.01, 525.08, 898.07; 384/535, 626; 403/366, 367, 371, 372, 202, 403/203, 220, 223, 282, 368, 369; 310/42, 310/90
See application file for complete search history.

(56) References Cited

U.S. PATENT DOCUMENTS

| | | | |
|---|---|---|---|
| 1,290,180 A | 1/1919 | Halbleib | |
| 1,738,037 A | 12/1929 | Collins | |
| 2,506,404 A | 5/1950 | Woodfield et al. | |
| 2,926,051 A | 2/1960 | Cazier et al. | |
| 2,931,412 A | 4/1960 | Wing | |
| 3,318,642 A | 5/1967 | Peterson | |
| T893,014 I4 * | 12/1971 | Gatzemeyer | 384/276 |
| 3,838,928 A | 10/1974 | Blaurock et al. | |
| 4,286,894 A | 9/1981 | Rongley | |
| 4,376,254 A | 3/1983 | Hellmann | |
| 4,981,390 A | 1/1991 | Cramer, Jr. et al. | |
| 5,059,042 A * | 10/1991 | Grierson | 384/537 |
| 6,333,839 B1 * | 12/2001 | Misso et al. | 360/265.7 |

* cited by examiner

*Primary Examiner*—A. Dexter Tugbang
*Assistant Examiner*—Livius R Cazan
(74) *Attorney, Agent, or Firm*—Michael Best & Friedrich LLP (57) ABSTRACT

An electric motor includes a stator, a housing supporting the stator and having a bearing seat with an inner surface and an inner end, a bearing having an outer surface, a shaft rotatably supported by the bearing, and a rotor supported by the shaft. The motor also includes a tolerance ring having an interior surface, an exterior surface disposed against the bearing seat inner surface, and a plurality of elastic corrugations. Each of the elastic corrugations projects radially from the interior surface, defining a shoulder section disposed between the bearing and the inner end of the bearing seat. The shoulder section generates a spring force against the bearing to axially and radially support the bearing and to axially preload the bearing.

15 Claims, 5 Drawing Sheets

METHOD FOR ASSEMBLING AN ELECTRIC MOTOR USING A SLIP FIT TOLERANCE RING

BACKGROUND

The present invention relates to an electric motor and to seating a bearing in a housing of the electric motor.

SUMMARY

In one embodiment, the invention provides an electric motor including a stator, a housing supporting the stator and having a bearing seat with an inner surface and an inner end, a bearing having an outer surface, a shaft rotatably supported by the bearing, a rotor supported by the shaft, and a tolerance ring. The tolerance ring includes an exterior surface disposed against the bearing seat inner surface, an interior surface supporting the bearing outer surface, and a plurality of elastic corrugations radially projecting from the interior surface. Each corrugation defines a shoulder section disposed between the bearing and the inner end of the bearing seat. The shoulder generates a spring force against the bearing to axially and radially support the bearing and to axially preload the bearing.

In another embodiment, the invention provides a tolerance ring including an interior surface, a first edge, a second edge opposite to the first edge, and a plurality of elastic corrugations. The elastic corrugations project radially from the interior surface and each corrugation defines a ridge. The ridge of each corrugation tapers off in the direction from the first edge to the second edge, forming a small angle with the interior surface.

In another embodiment, the invention provides an electric motor including a stator, a housing supporting the stator and having a bearing seat with an inner surface and an inner end, a shoulder being substantially adjacent to the inner end and including a plurality of grooves. The motor also includes a bearing having an outer surface, a shaft rotatably supported by the bearing, a rotor supported by the shaft, and a tolerance ring. The tolerance ring includes a first edge, an exterior surface disposed against the bearing seat inner surface, an interior surface supporting the bearing outer surface, and a plurality of tabs. Each tab projects axially from the first edge of the tolerance ring and extends into one corresponding groove to inhibit rotation of the tolerance ring.

In another embodiment, the invention provides a method for assembling an electric motor having a housing supporting a stator, and a bearing supporting a shaft. The method includes providing the housing with a bearing seat having an inner end, and providing a tolerance ring including an interior surface and a plurality of elastic corrugations projecting from the interior surface. The method also includes seating the tolerance ring into the bearing seat, pressing the bearing into the tolerance ring, and deforming each corrugation to form a shoulder. Each shoulder is disposed between the bearing and the inner end of the bearing seat, generating a spring force against the bearing to axially and radially support the bearing and to axially preload the bearing.

In another embodiment, the invention provides a method for assembling an electric motor having a housing supporting a stator, and a bearing supporting a shaft. The method includes providing the housing with a bearing seat, providing the bearing with an outer race having an outer surface, and providing a tolerance ring. The tolerance ring includes an interior surface, a first edge, a second edge opposite to the first edge, and a plurality of elastic corrugations. Each corrugation projects from the interior surface and defines a ridge tapering off in the direction from the first edge to the second edge to form a small angle with the interior surface. The method also includes fitting the tolerance ring in the bearing seat, and pressing the bearing into the tolerance ring so that the outer surface of the bearing engages the corrugations to generate a reaction force generally perpendicular to the corrugation ridge. The reaction force has an axial component and a normal component. The axial component resists the pressing of the bearing into the tolerance ring, and the normal component inhibits creep of the bearing outer race with respect to the tolerance ring.

In another embodiment, the invention provides a method for assembling an electric motor having a housing, a stator supported by the housing, and a rotor. The method includes providing the housing with a bearing seat having a substantially cylindrical inner surface with inner and outer ends, and a locking notch disposed at the outer end. The method also includes providing a shaft and bearing assembly. The assembly includes a bearing having an outer race with a substantially cylindrical outer surface, and a shaft rotatably supported by the bearing, where the bearing and the rotor are press fitted to the shaft. The method also includes providing a spring steel strip defining an exterior surface, an interior surface, an outer edge, an inner edge opposite the outer edge, a width between the inner and outer edges, a first end, and a second end opposite the first end. The strip has one locking tab extending radially outward from one of the first and second ends, a plurality of cylindrical stiffeners being substantially evenly distributed along the width and projecting from the interior surface, and at least three elastic corrugations extending between the inner and outer edges and substantially evenly spaced along the interior surface. Each corrugation defines a rib-like structure projecting from the interior surface and defining a corrugation ridge tapering off in the direction from the inner edge to the outer edge to form a small angle with the interior surface.

The method also includes rolling the strip along its length to form a substantially cylindrical tolerance ring, and fitting the tolerance ring into the bearing seat. Fitting the tolerance ring includes disposing the exterior surface of the tolerance ring against the inner surface of the bearing seat, disposing the locking tab in the locking notch to resist rotational motion of the ring with respect to the bearing seat, and disposing the inner edge of the tolerance ring against the inner end of the bearing seat.

The method also includes installing the shaft and bearing assembly into the tolerance ring. Installing the shaft includes pressing the bearing into the tolerance ring so that the outer surface of the bearing engages the corrugations to generate a reaction force generally perpendicular to the corrugation ridge. The reaction force has an axial component and a normal component. The axial component resists the pressing of the bearing into the tolerance ring, and the normal component inhibits creep of the bearing outer race with respect to the tolerance ring. Installing the shaft also includes deforming the corrugations to form a generally flat section and a shoulder section. The flat section is disposed between the outer surface of the outer race and the inner surface of the bearing seat to radially support the bearing and inhibit the bearing from slipping out of the bearing seat. The shoulder section is disposed between the bearing and the inner end of the bearing seat, generating a spring force against the bearing to axially and radially support the bearing and to axially preload the bearing. Installing the shaft also includes radially supporting the bearing with the stiffeners to inhibit the collapse of the corrugations and to preserve the elastic characteristics of the corrugations.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
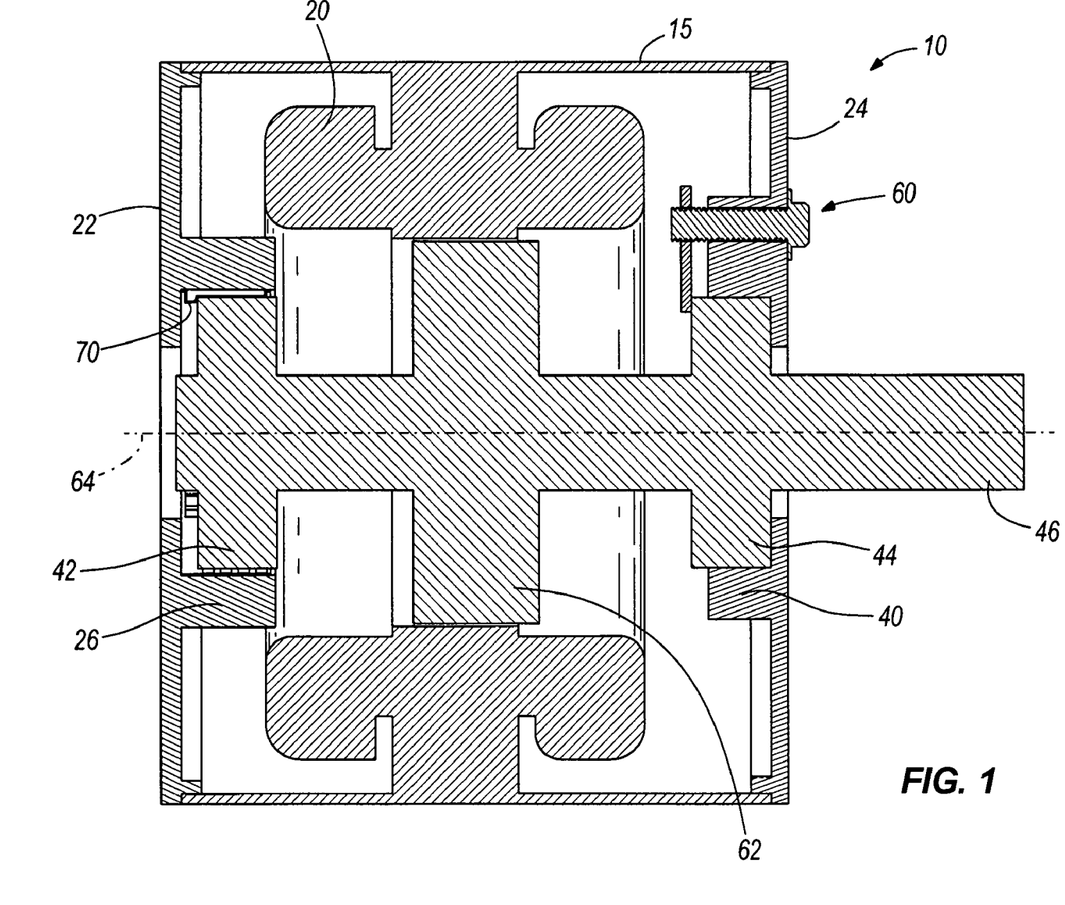
FIG. 1 is a sectional view of an electric motor embodying the invention.

FIG. 1 is a sectional view of an electric motor 10 embodying the invention. The motor 10 is preferably a fractional horse power ("FHP") motor, although the invention is applicable to other types of motors, as will be appreciated by those skilled in the art. The motor 10 has a housing 15 supporting a stator 20. Left and right end frames 22, 24 are mounted on the housing 15. The housing 15 and end frames 22, 24 are preferably made of aluminum. The left end frame 22 includes (see FIG. 2) a bearing seat 26 having a substantially cylindrical inner surface 28 with inner and outer ends 30, 32, and a notch 34 at the outer end 32. The bearing seat 26 also has a generally planar inner end surface 36. The right end frame 24 has a similar bearing seat 40, but without the notch 34. The bearing seats 26, 40 respectively house left and right bearings 42, 44 that rotatably support a shaft 46. Each of the bearings 42, 44 has an inner race 48 and an outer race 52. The outer race 52 has a generally cylindrical outer surface 54. A screw and locking clip assembly 60 retains the right bearing 44 in the bearing seat 40. The manner in which the left bearing 42 is held in the bearing seat 26 is described below. The bearings 42, 44 are preferably press fitted onto the shaft 46. A rotor 62 is mounted on the shaft 46 for rotation therewith relative to the stator 20. When seated, the bearings 42, 44 support the shaft 46 and the rotor 62 for rotation about a rotational axis 64. The motor 10 as thus far described is known in the art and need not be described in greater detail.

Figure 2:
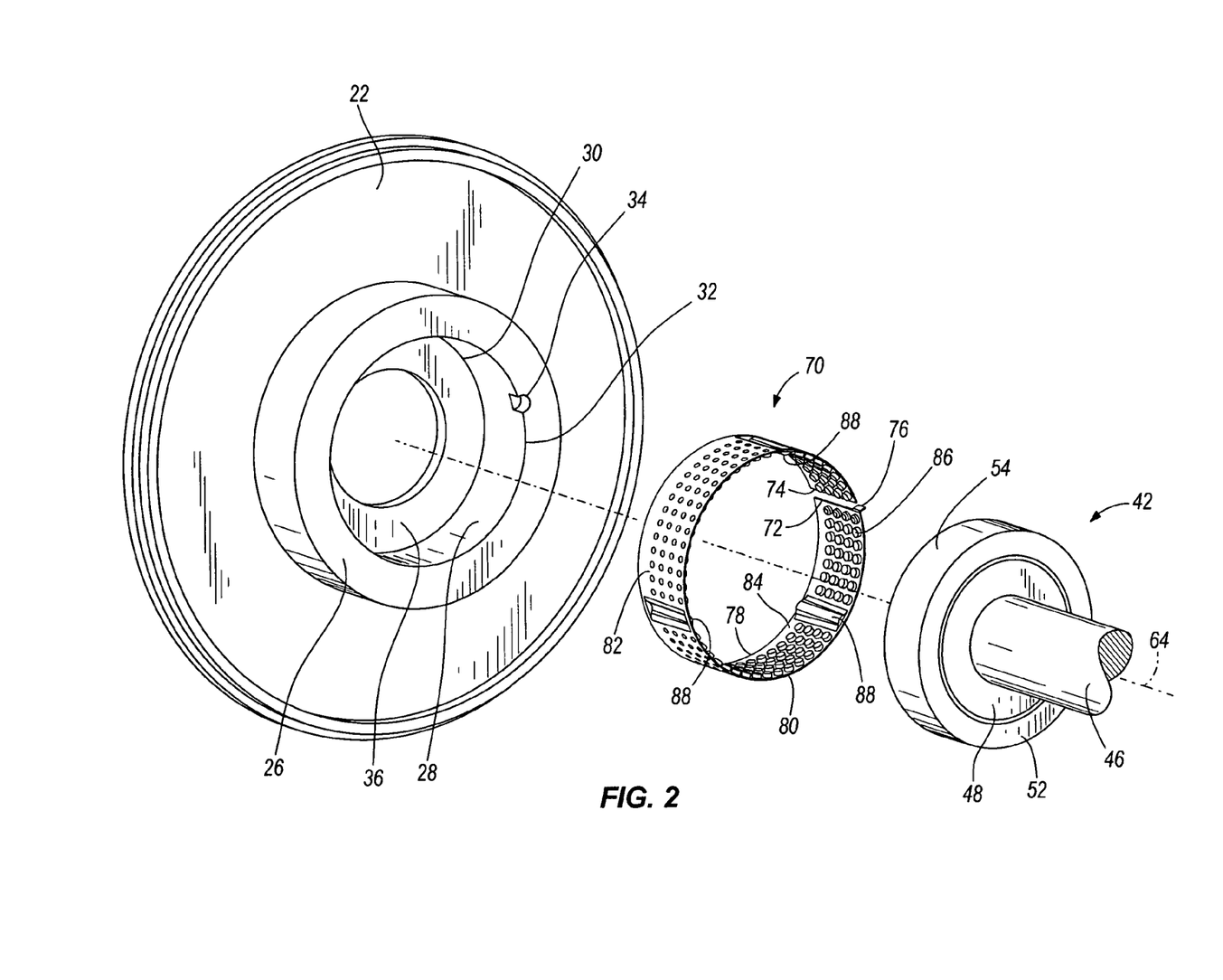
FIG. 2 is an exploded view of a shaft and bearing assembly, an end frame, and a tolerance ring.

FIG. 2 is an exploded view of the left end frame 22 and the left bearing 42 supporting the shaft 46. FIG. 2 also illustrates a tolerance ring 70 to be seated in the bearing seat 26 to support the bearing 42. The tolerance ring 70 is preferably made by rolling a substantially rectangular spring steel strip into a cylinder. In other embodiments, the strip can be manufactured of other metals, such as aluminum and copper. The strip may also be manufactured with materials other than metals. The tolerance ring 70 includes first and second ends 72, 74 defining a length therebetween (the circumference of the ring 70), a tab 76 radially extending from the first end 72 (the tab 76 may also extend from the second end 74) and inner and outer edges 78, 80. Generally, the axial distance between the inner and outer edges 78, 80 (the width of the strip) is similar to the axial distance between the inner and outer ends 30, 32 of the bearing seat 26. The tolerance ring 70 also includes an exterior surface 82 and an interior surface 84. A plurality of stiffeners 86 extend from the interior surface 84. Each of the stiffeners 86 defines a cylindrical shape, though other shapes may be possible. The stiffeners 86 are generally evenly distributed on the interior surface 84, though in other embodiments the stiffeners 86 may define a different pattern on the interior surface 84.

Figure 3:
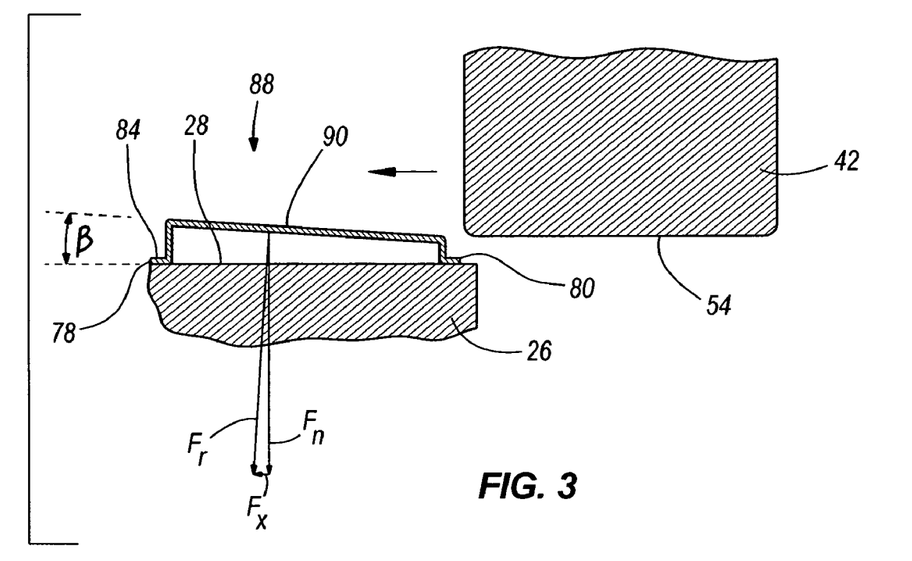
FIG. 3 is an exploded view of a bearing and a tolerance ring supported by a bearing seat, prior to seating of the bearing.

As illustrated in FIG. 2, three corrugations 88 also extend from the interior surface 84. In the preferred embodiment, the corrugations 88 are substantially evenly spaced along the ring 70. Each of the three corrugations 88 defines a rib-like structure oriented in the axial direction. In this embodiment, as shown in FIG. 3, the rib-like structure is characterized by a ridge surface 90 tapering off in the direction from the inner edge 78 to the outer edge 80. Thus, the ridge surface 90 of each of the corrugations 88 defines a relatively small angle β relative to the interior surface 84.

The tolerance ring 70 is fitted in the bearing seat 26, disposing the exterior surface 82 of the tolerance ring 70 against the inner surface 28 of the bearing seat 26. The inner edge 78 of the tolerance ring 70 is disposed against the surface 36. Additionally, the tab 76 is disposed in the notch 34 to help prevent rotation of the tolerance ring 70 with respect to the bearing seat 26. The bearing 42 is press fitted in the tolerance ring 70 after fitting the tolerance ring 70 in the bearing seat 26. The tolerance ring 70 axially and radially supports the bearing 42 to inhibit rotation of the outer race 52 with respect to the bearing seat 26 and allow rotation of the inner race 48 supporting the shaft 46.

FIG. 3 illustrates one of the corrugations 88 and the bearing 42 before seating in the beating seat 26. Pressing the bearing 42 in the axial direction (to the left in FIG. 3) against the tolerance ring 70 causes the outer surface 54 of the bearing 42 to engage each of the corrugations 88, producing a reaction force Fr generally perpendicular to the ridge surface 90. The reaction force Fr can be broken into a radial component Fn and an axial component Fx. The axial component Fx is generally smaller in magnitude than the radial component Fn and opposes the pressing of the bearing 42 against the tolerance ring 70. The axial component Fx is generally the amount of force needed to press the bearing 42 into the bearing seat 26. The radial component Fn is perpendicular to the rotational axis 64 or normal to the bearing outer surface 54 and this force generally helps inhibit creep of the outer race 52 with respect to the tolerance ring 70.

Figure 4:
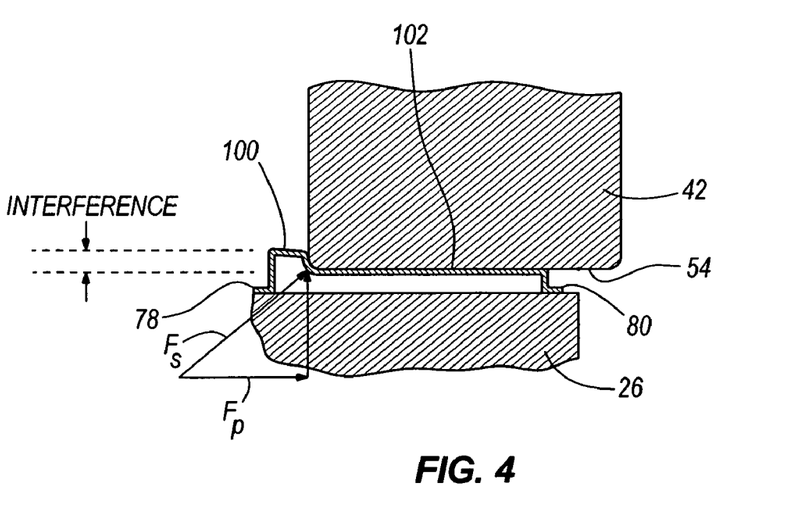
FIG. 4 is a view similar to FIG. 3 after seating of the bearing.

Fully pressing the bearing 42 into the bearing seat 26 deforms the corrugations 88 to form a shoulder 100 on each of the corrugations 88, as illustrated in FIG. 4. Each shoulder 100 overlaps the bearing 42 a radial distance defined as interference. The radial distance of the interference can be measured between the outer surface 54 and the radially inner most portion of the shoulder 100. The shoulder 100 is an elastic deformation generating a constant spring force Fs against the outer race 52. The amount of the force Fs is generally a function of parameters such as material thickness (thickness of the strip), the size of the interference, and the shape of the corrugation 88. The force Fs has an axial component Fp that is a preload force on the bearing 42. It is possible to fine tune the axial component Fp to substantially match the axial preload requirement of the bearing 42.

Deforming the corrugations 88 also helps define a substantially flat section 102 on each corrugation 88. It is to be understood that the flat section 102 is not truly flat, but defines a relatively small arc pressed against the outer race 52 of the bearing 42. The flat section 102 of each of the corrugations 88 helps to radially support the bearing 42 and inhibits the bearing 42 from slipping out of the bearing seat 26. Additionally, the stiffeners 86 generate a radial force (not shown) perpendicular to the rotational axis 64 to help support the bearing 42 and inhibit axial and/or rotational motion of the outer race 52 with respect to the bearing seat 26. The radial force generated by the stiffeners 86 also helps preserve the elastic characteristic of the corrugations 88, thus allowing the tolerance ring 70 to be used multiple times.

The tolerance ring 70 may be utilized to replace other devices helping support the bearing, such as a hard bearing insert and a wave spring. Hard bearing inserts usually require more machining time to manufacture, and utilizing the two devices to support the bearing makes assembly of the motor generally more difficult. One advantage of supporting the bearing in the bearing seat utilizing the tolerance ring 70 is the reduction of part count. Reducing the number of parts increases reliability of the motor and reduces assembly time. Because the tolerance ring 70 features at least one component (e.g. tab 76) to help inhibit its own rotation with respect to the bearing seat, it reduces the possibility of failure of the motor and allows manufacturing of the end frame with less expensive material, such as aluminum. Thus, utilizing the tolerance ring 70 to support the bearing usually causes reduction in machining time and increase in reliability. Other advantages may also become clear to those skilled in the art.

Figure 5:
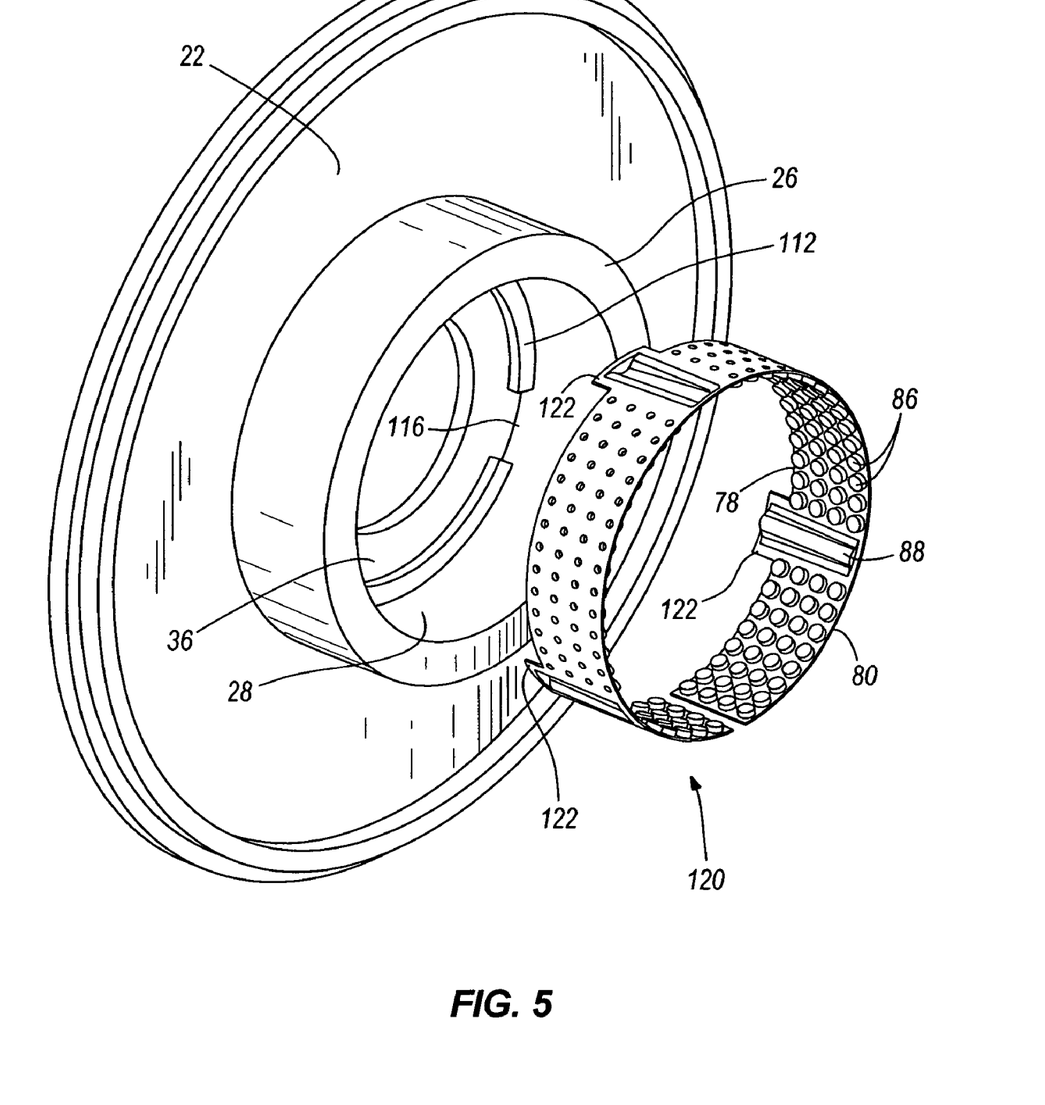
FIG. 5 is an exploded view of an alternative embodiment of the invention.

FIG. 5 illustrates an alternative embodiment of the invention. Except as described below, this embodiment is identical to the embodiment of FIGS. 1-4, and common elements have the same reference numerals. The bearing seat 26 includes a bearing shoulder 112 adjacent to the inner end surface 36. The bearing shoulder 112 includes three locking grooves 116 (only shown one) substantially evenly spaced. A tolerance ring 120 includes three locking tabs 122 axially extending from the inner edge 78. Each of the locking tabs 122 defines a substantially rectangular shape. In this embodiment, each of the corrugations 88 substantially aligns with a corresponding locking tab 122. Thus, the axial length of each corrugation 88 is generally greater than the axial length between the inner and outer edges 78, 80. Other embodiments can include corrugations not in axial alignment with the locking tabs. In the embodiment illustrated in FIG. 5, each of the locking tabs 122 extends into a corresponding locking groove 116 to inhibit rotation of the tolerance ring 120 with respect to the bearing seat 26. Additionally, the inner edge 78 is disposed against the bearing shoulder 112.

Figure 6:
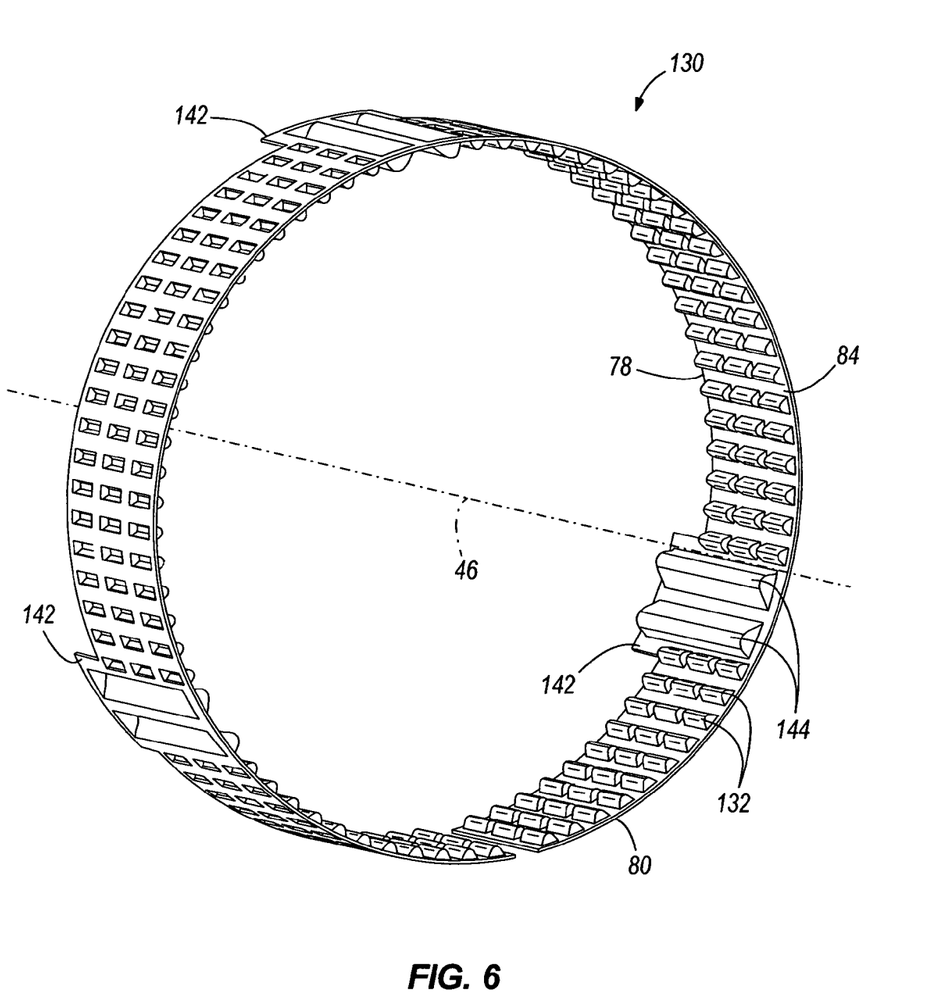
FIG. 6 is another alternative tolerance ring.

FIG. 6 illustrates an alternative tolerance ring 130 including a plurality of stiffeners 132 extending from the interior surface 84. Each of the stiffeners 132 defines a rib-like structure oriented parallel to the rotational axis 46. The stiffeners 132 are evenly spaced between the inner and outer edges 78, 80. The tolerance ring 130 also includes three locking tabs 142 axially extending from the inner edge 78. Each of the locking tabs 142 defines a substantially rectangular shape and is configured to fit in a corresponding locking groove, similar to the grooves 116 illustrated in FIG. 5. Three pairs of corrugations 144 extend from the interior surface 84 of the tolerance ring 130, and each pair of corrugations 144 axially aligns with a corresponding locking tab 142. Each of the corrugations 144 defines a rib like structure substantially similar in shape to the structure defined by each of the stiffeners 132. Fully pressing a bearing into the tolerance ring 130 causes the corrugations to be pressed toward the bearing seat (similar to the corrugations 88 in FIGS. 3-4). Because in this embodiment the corrugations 144 are grouped in pairs, the corrugations 144 in each pair are also pushed away from each other when seating the bearing in the bearing seat. The arrangement of the corrugations 144 illustrated in FIG. 6 offers additional flexibility of the tolerance ring 130 and a greater flat section in comparison to the embodiment illustrated in FIGS. 1-4, for example.

Various features and advantages of the invention are set forth in the following claims.

What is claimed is:

1. A method for assembling an electric motor having a housing supporting a stator, and a bearing supporting a shaft, the method comprising:
   providing the housing with a bearing seat having an inner end;
   providing a tolerance ring including an interior surface and a plurality of elastic corrugations projecting from the interior surface;
   fitting the tolerance ring into the bearing seat;
   pressing the bearing into the tolerance ring; and
   deforming each corrugation with the bearing, as the bearing is being pressed into the tolerance ring, to form a shoulder, wherein each shoulder remains after the bearing is fully seated in the bearing seat so that each shoulder generates a spring force against the bearing to axially and radially support the bearing and to axially preload the bearing.

2. The method of claim 1, wherein deforming each corrugation includes forming a generally flat section disposed between the bearing and the bearing seat to radially support the bearing and to inhibit the bearing from slipping out of the bearing seat.

3. The method of claim 1, wherein fitting the tolerance ring into the bearing seat includes
   providing the bearing seat with an inner surface;
   providing the tolerance ring with an exterior surface; and
   disposing the exterior surface of the tolerance ring against the inner surface of the bearing seat.

4. The method of claim 1, wherein fitting the tolerance ring into the bearing seat includes
   providing the bearing seat with a locking notch;
   providing the tolerance ring with a first end, a second end, and a locking tab extending from one of the first and second ends; and
   disposing the locking tab in the locking notch to resist rotation of the tolerance ring with respect to the bearing seat.

5. The method of claim 1, wherein fitting the tolerance ring into the bearing seat includes
   providing the tolerance ring with an inner edge; and
   disposing the inner edge against the inner end of the bearing seat.

6. The method of claim 5, wherein fitting the tolerance ring into the bearing seat further includes
   providing the bearing seat with a bearing shoulder adjacent the inner end, providing the tolerance ring with a second inner edge an axial distance from the inner edge, and disposing the second inner edge against the bearing shoulder.

7. The method of claim 1, further comprising providing the tolerance ring with a plurality of stiffeners projecting from the interior surface; and radially supporting the bearing with the stiffeners to help preserve the elastic characteristics of the corrugations.

8. A method for assembling an electric motor having a housing supporting a stator, and a bearing supporting a shaft, the method comprising:

providing the housing with a bearing seat having an inner end;

providing a tolerance ring including an interior surface and a plurality of elastic corrugations projecting from the interior surface;

fitting the tolerance ring into the bearing seat;

pressing the bearing into the tolerance ring toward the inner end of the bearing seat; and while pressing the bearing into the tolerance ring, deforming each corrugation with the bearing to form a shoulder on the corrugation, the shoulder being located between the bearing and the inner end of the bearing seat, and the shoulder remaining after the bearing is fully seated in the bearing seat.

9. The method of claim 8, wherein deforming each corrugation includes forming a generally flat section disposed between the bearing and the bearing seat to radially support the bearing and to inhibit the bearing from slipping out of the bearing seat.

10. The method of claim 8, wherein fitting the tolerance ring into the bearing seat includes providing the bearing seat with an inner surface;

providing the tolerance ring with an exterior surface; and disposing the exterior surface of the tolerance ring against the inner surface of the bearing seat.

11. The method of claim 8, wherein fitting the tolerance ring into the bearing seat includes providing the bearing seat with a locking notch;

providing the tolerance ring with a first end, a second end, and a locking tab extending from one of the first and second ends; and disposing the locking tab in the locking notch to resist rotation of the tolerance ring with respect to the bearing seat.

12. The method of claim 8, wherein fitting the tolerance ring into the bearing seat includes providing the tolerance ring with an inner edge; and disposing the inner edge against the inner end of the bearing seat.

13. The method of claim 12, wherein fitting the tolerance ring into the bearing seat further includes providing the bearing seat with a bearing shoulder adjacent the inner end, providing the tolerance ring with a second inner edge an axial distance from the inner edge, and disposing the second inner edge against the bearing shoulder.

14. The method of claim 8, further comprising providing the tolerance ring with a plurality of stiffeners projecting from the interior surface; and radially supporting the bearing with the stiffeners to help preserve the elastic characteristics of the corrugations.

15. The method of claim 8, wherein each shoulder generates a spring force against the bearing to axially and radially support the bearing and to axially preload the bearing.

* * * * *

UNITED STATES PATENT AND TRADEMARK OFFICE
CERTIFICATE OF CORRECTION

PATENT NO. : 7,610,671 B2  Page 1 of 1
APPLICATION NO. : 11/262635
DATED : November 3, 2009
INVENTOR(S) : Watkins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Twelfth Day of October, 2010

David J. Kappos
*Director of the United States Patent and Trademark Office*